(12) United States Patent
Kosslyn et al.

(10) Patent No.: US 10,409,459 B2
(45) Date of Patent: *Sep. 10, 2019

(54) QUERYING PUBLISHER GOAL AND CUSTOMIZING SUGGESTIONS TO ACHIEVE GOAL

(71) Applicant: Google LLC, Mountain View, CA (US)

(72) Inventors: David Kosslyn, San Francisco, CA (US); Joshua Abraham Tabak, San Francisco, CA (US); Eric Brandon Mayers, San Francisco, CA (US)

(73) Assignee: Google LLC, Mountain View, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/384,696

(22) Filed: Dec. 20, 2016

(65) Prior Publication Data

US 2017/0102842 A1   Apr. 13, 2017

Related U.S. Application Data

(63) Continuation of application No. 14/243,541, filed on Apr. 2, 2014, now Pat. No. 9,547,424.

(51) Int. Cl.
| | |
|---|---|
| *G06F 3/048* | (2013.01) |
| *G06F 3/0482* | (2013.01) |
| *G06F 3/0484* | (2013.01) |
| *G06F 16/735* | (2019.01) |
| *G06F 16/2457* | (2019.01) |
| *H04L 29/08* | (2006.01) |
| *G06Q 30/02* | (2012.01) |
| *G06F 3/0481* | (2013.01) |

(52) U.S. Cl.
CPC ........ *G06F 3/0482* (2013.01); *G06F 3/04842* (2013.01); *G06F 16/24578* (2019.01); *G06F 16/735* (2019.01); *G06Q 30/02* (2013.01); *H04L 67/306* (2013.01); *G06F 3/0481* (2013.01); *G06F 2203/04803* (2013.01)

(58) Field of Classification Search
CPC .................................................... G06F 3/0481
See application file for complete search history.

(56) References Cited

U.S. PATENT DOCUMENTS

| | | |
|---|---|---|
| 6,507,726 B1 | 1/2003 | Atkinson et al. |
| 6,766,362 B1 | 7/2004 | Miyasaka et al. |

(Continued)

OTHER PUBLICATIONS

Ha, A., "Facebook Continues to Simplify Ad Buying With New Objective-Based Interface", TechCrunch, Oct. 8, 2013, pp. 1-6, available at: http://techcrunch.com/2013/10/08/facebook-objective-based-ad-buying/, Last accessed Feb. 5, 2014.

(Continued)

*Primary Examiner* — Matthew Ell
(74) *Attorney, Agent, or Firm* — Byrne Poh LLP

(57) ABSTRACT

This disclosure generally relates to systems and methods that facilitate querying a content publisher for their goal(s) in employing a content sharing site and providing customized suggestions, such as recommendations, site tools, site dashboards, and site displays to assist in achieving the goal(s). Additionally, the specified goals are employed in conjunction with monitoring publisher interactions with the content sharing site to learn behaviors that that predict a publisher goal.

21 Claims, 10 Drawing Sheets

(56) References Cited

U.S. PATENT DOCUMENTS

| | | |
|---|---|---|
| 2006/0200432 A1 | 9/2006 | Flinn et al. |
| 2008/0034314 A1* | 2/2008 | Louch .................. G06F 3/0481 715/778 |
| 2011/0191339 A1 | 8/2011 | Ramanathan et al. |

OTHER PUBLICATIONS

Office Action dated May 16, 2016 in U.S. Appl. No. 14/243,541.
Notice of Allowance dated Sep. 12, 2016 in U.S. Appl. No. 14/243,541.

* cited by examiner

QUERYING PUBLISHER GOAL AND CUSTOMIZING SUGGESTIONS TO ACHIEVE GOAL

CROSS-REFERENCE TO RELATED APPLICATION

This application is a continuation of U.S. patent application Ser. No. 14/243,541, filed Apr. 2, 2014, which is hereby incorporated by reference herein in its entirety.

TECHNICAL FIELD

This disclosure generally relates to systems and methods that facilitate querying a content publisher for their goal(s) in employing a content sharing site and providing customized suggestions, such as recommendations, site tools, site dashboards, and site displays to assist in achieving the goal(s). Additionally, the specified goals are employed in conjunction with monitoring publisher interactions with the content sharing site to learn behaviors that predict a publisher goal.

BACKGROUND

Content sharing sites allow a wide variety of publishers to publish content for viewing by consumers. Given the diversity of publishers, there can be many goals for publishing content on the content sharing site. For example, some publishers are trying to monetize their content through advertisement revenue, other publishers may want to drive traffic to another site where their product can be purchased, and still other publishers may be trying to become famous (e.g. a musician). However, content sharing sites conventionally provide a common set of displays, features, and tools irrespective of the goals of the publisher.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with a non-limiting implementation, on a content sharing site in association with a user profile, a selection element is presented comprising a plurality of options indicative of respective goals for employing the user profile with the content sharing site, input associated with the user profile is received indicating selection of one or more options of the plurality of options, and one or more suggestions are provided for use of the content sharing site by the user profile based upon the selected one or more options.

In accordance with a non-limiting implementation, a goal query component is configured to display on a content sharing site in association with a user profile a selection element comprising a plurality of options indicative of respective goals for employing the user profile with the content sharing site and obtain input associated with the user profile indicating selection of one or more options of the plurality of options, and a suggestion generation component is configured to present one or more suggestions for use of the content sharing site by the user profile based upon the selected one or more options.

These and other implementations and embodiments are described in more detail below.

DETAILED DESCRIPTION

Figure 1:
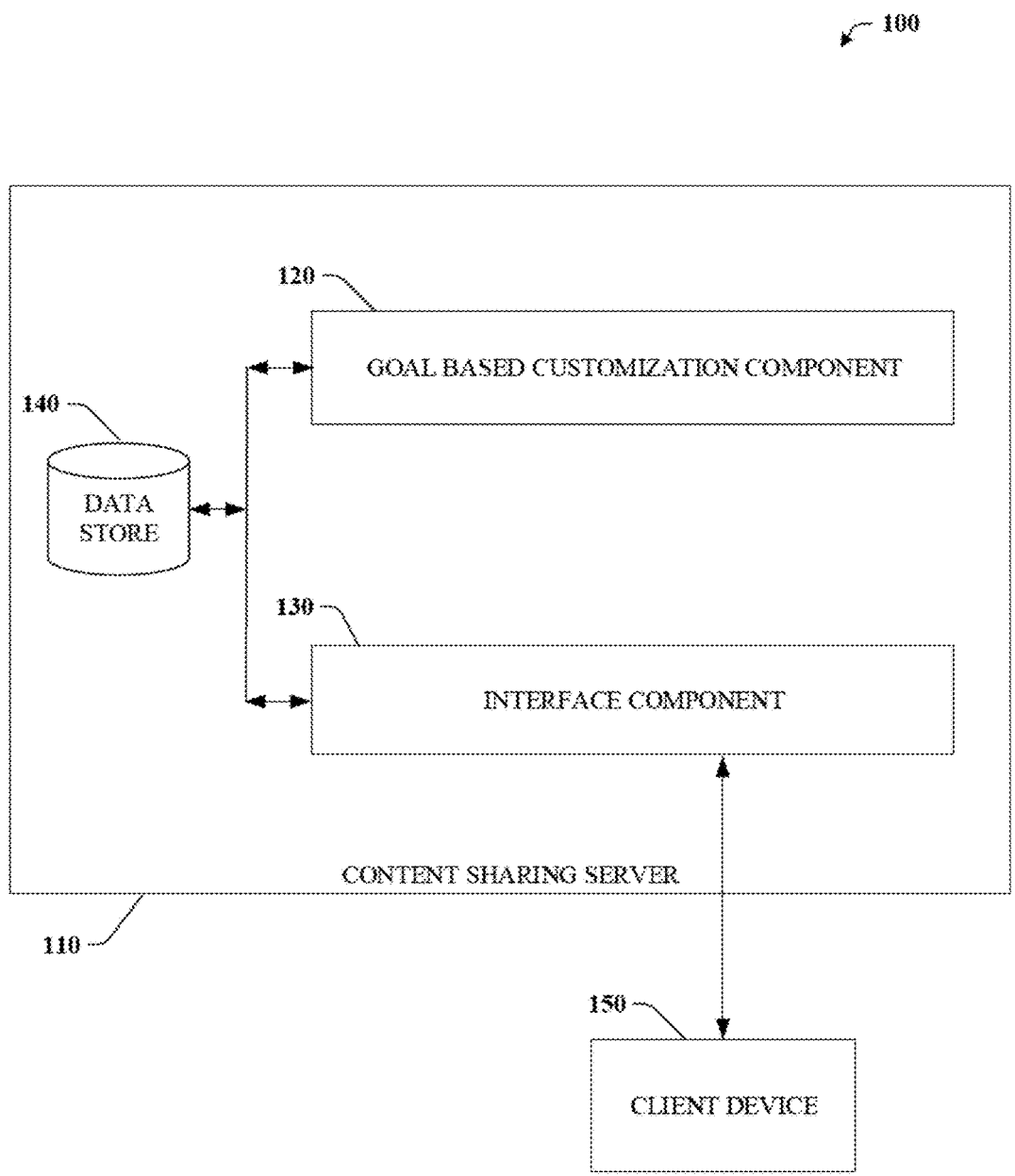
FIG. 1 illustrates a block diagram of an exemplary non-limiting example system for querying a publisher for their goal(s) in using a content sharing site and customizing recommendations, features, tools, displays, communications, and other aspects of the content sharing site to assist in achieving the goal(s) in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In situations in which systems and methods described herein collect personal information about users, or may make use of personal information, the users can be provided with an opportunity to control whether programs or features collect user information (e.g., information about a user's social network, social actions or activities, profession, a user's preferences, or a user's current location), or to control whether or how to receive content from a content server that may be more relevant to the user. In addition, certain data can be treated in one or more ways before stored or used, so that personally identifiable information is removed. For example, a user's identity can be treated so that no personally identifiable information can be determined for the user, or a user's geographic location can be generalized where location information is obtained (e.g., such as to a city, ZIP code, or state level), so that a particular location of a user cannot be determined. The user can add, delete, or modify information about the user. Thus, the user can control how information is collected about her and used by a server.

In accordance with various disclosed aspects, a mechanism is provided for querying a publisher (e.g. user of the site) for their goal(s) in using a content sharing site and customizing suggestions, such as, recommendations, features, tools, displays, communications, and other aspects of the content sharing site to assist in achieving the goal(s). For example, a publisher that is publishing content in order to generate revenue from their content will likely want tools presented that allow them to manage advertisement presented in conjunction with their content. Furthermore, the publisher may want suggestions on how to improve his content in order generate revenue. In another example, a publisher that is publishing content associated with a product they are promoting may not want additional advertisements presented with their content. However, the publisher may be interested in a dashboard that provides information on which content or portions of content she published that are getting the most traction so she can fine tune her message. In a further example, a publisher that is generating content that shows his knowledge and skill in a particular area may benefit from suggestions or tools that allow him gain greater exposure to a select audience related to that skill area.

While embodiments presented herein use video content in a video sharing site for ease of explanation, it is to be appreciated that concepts herein are applicable to any suitable content including, for example, video, audio, image, text, or any combination thereof, non-limiting examples of which include, music, speeches, cartoons, short films, movies, televisions shows, documents, books, magazines, articles, novels, quotes, poems, comics, advertisements, photos, posters, prints, paintings, artwork, graphics, games, applications, or any other suitable creative work that can be captured and/or conveyed through video, audio, image, text, or any suitable combination thereof.

Referring now to the drawings, FIG. 1 depicts a system 100 for querying a publisher for their goal(s) in using a content sharing site and customizing recommendations, features, tools, displays, communications, and other aspects of the content sharing site to assist in achieving the goal(s). System 100 includes content sharing server 110 that includes goal based customization component 120 that customizes a content sharing site for a publisher to assist in achieving his goal(s). Content sharing server 110 also includes interface component 130 that interacts with client device(s) 150 to facilitate exchange of data. Additionally, content sharing server 110 includes a data store 140 that can store content and data generated and/or received by content sharing server 110, goal based customization component 120, and interface component 130. Data store 140 can be stored on any suitable type of storage device, non-limiting examples of which are illustrated with reference to FIGS. 8 and 9.

Figure 9:
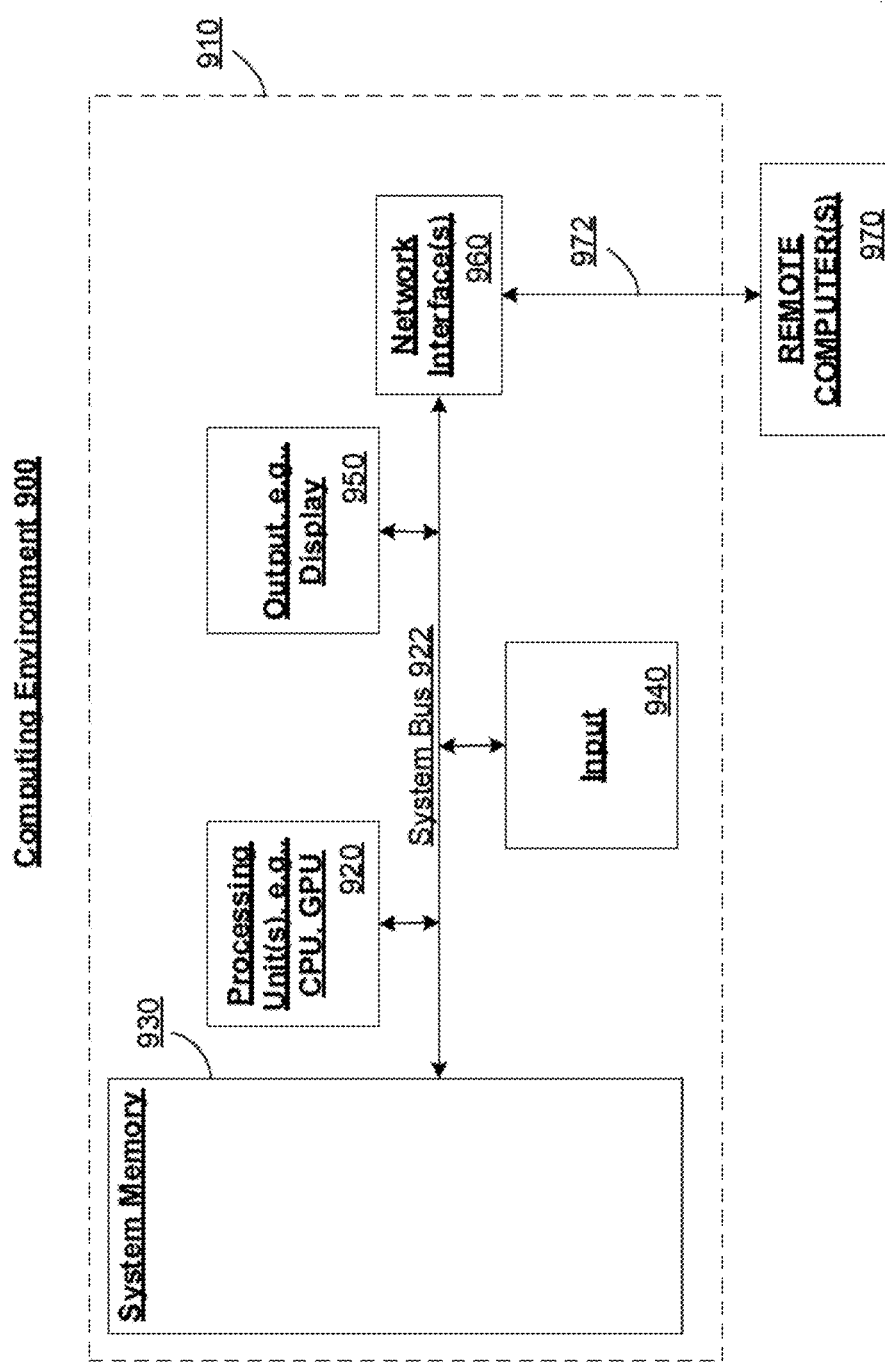
FIG. 9 illustrates a block diagram of an exemplary non-limiting computing system or operating environment in which various embodiments can be implemented.

Content sharing server 110 and client device 150 include at least one memory that stores computer executable components and at least one processor that executes the computer executable components stored in the memory, a non-limiting example of which can be found with reference to FIG. 9. Content sharing server 110 can communicate via a wired and/or wireless network with client device 150. Furthermore, Content sharing server 110 can communicate with any suitable number of client devices 150, and client device 150 can communicate with any suitable number of content sharing servers 110.

Content sharing server 110 and client device 150 can be any suitable type of device for recording, interacting with, receiving, accessing, or supplying data locally, or remotely over a wired or wireless communication link, non-limiting examples of which include a wearable device or a non-wearable device. Wearable device can include, for example, heads-up display glasses, a monocle, eyeglasses, contact lens, sunglasses, a headset, a visor, a cap, a helmet, a mask, a headband, clothing, camera, video camera, or any other suitable device capable of recording, interacting with, receiving, accessing, or supplying data that can be worn by a human or non-human user. Non-wearable device can include, for example, a mobile device, a mobile phone, a camera, a camcorder, a video camera, personal data assistant, laptop computer, tablet computer, desktop computer, server system, cable set top box, satellite set top box, cable modem, television set, monitor, media extender device, Blu-ray device, DVD (digital versatile disc or digital video disc) device, compact disc device, video game system, portable video game console, audio/video receiver, radio device, portable music player, navigation system, car stereo, sensor, or any other suitable device capable of recording, interacting with, receiving, accessing, or supplying data. Moreover, Content sharing server 110 and client device 150 can include a user interface (e.g., a web browser or application), that can receive and present displays and data generated locally or remotely.

Figure 2:
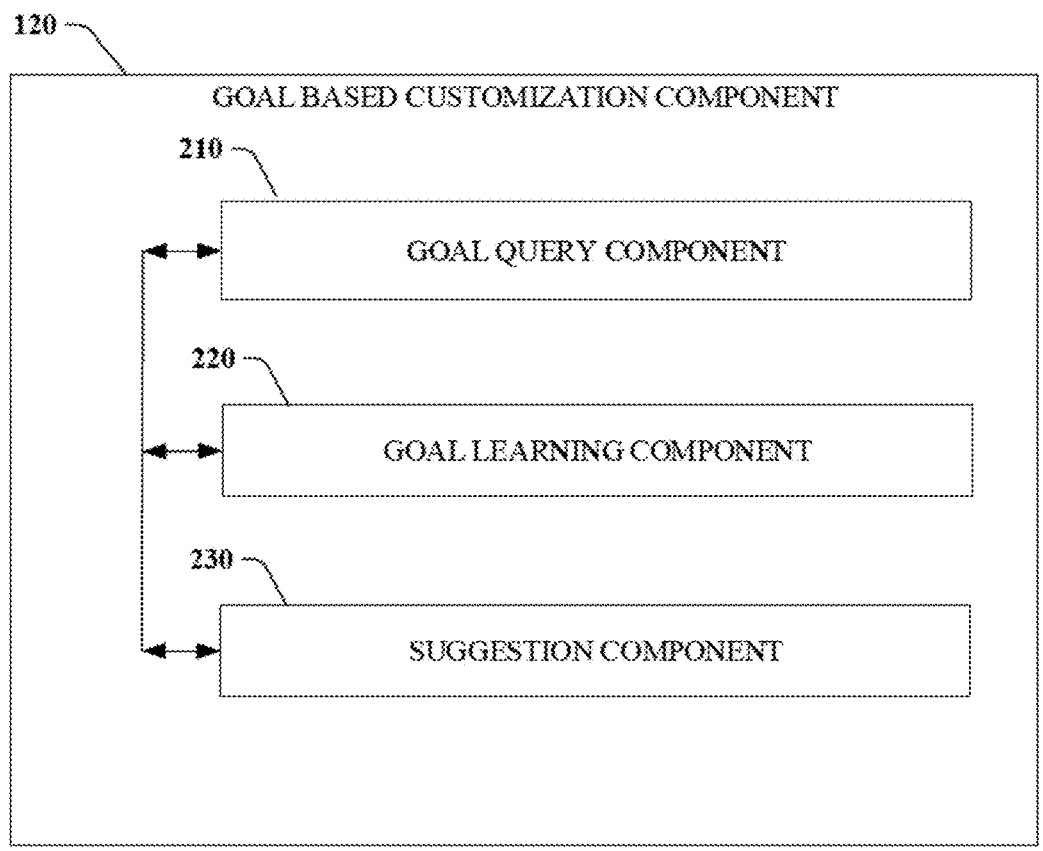
FIG. 2 illustrates a block diagram of an exemplary non-limiting goal based customization component that customizes a content sharing site for a publisher to assist in achieving his goal(s) in accordance with an implementation of this disclosure.

FIG. 2 illustrates goal based customization component 120 that includes goal query component 210 that queries a publisher for their goal(s) in using a content sharing site. For example, a publisher can be queried for their goal in using a content sharing site upon creating a user profile on the content sharing site, upon uploading content, upon creating a content channel, upon viewing content, or at any suitable interaction with the content sharing site. It is to be appreciated that goals can be tied to any identifier associated with a publisher at any levels of granularity, such as, a user profile, a content channel, a content, groups of content, groups of content channels, or with any other suitable level of granularity. For example, a publisher can have one or more overall goals associated with their user profile, and have more specific goals associated with a content channel and/or a content item. In another example, a publisher may only have specified a single goal that applies to her user profile and not have any goals specified at other levels of granularity. It should also be understood that goals can be hierarchically inherited according to the levels of granularity. For example, goals specified at a higher level of granularity can become default goals for a lower level of granularity, unless a lower level of granularity has a specified goal which would take precedence over the goals specified at the higher level of granularity.

Figure 4A:
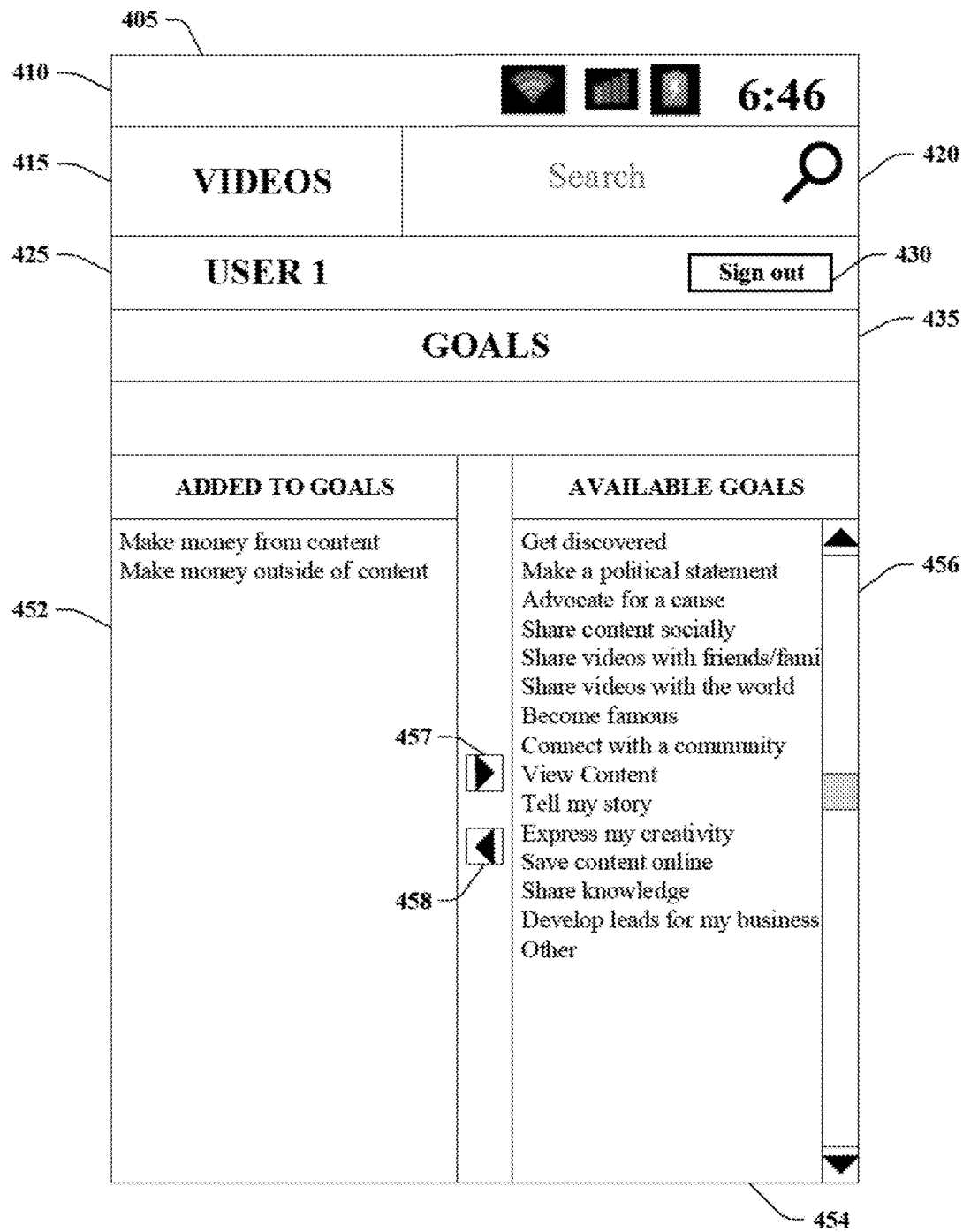
FIG. 4A illustrates a non-limiting example user interface for a publisher to specify their goal(s) in using a content sharing site in accordance with an implementation of this disclosure.

Referring to FIG. 4A, a non-limiting example user interface 405, such as on a client device 150, is illustrated. Client device 150 includes a notification area 410 that provides notifications to the user (e.g. publisher) using graphics or text. Additionally, user interface 405 includes a title area 415 that indicates the application or website currently active or in the foreground of the user interface, which in this example is "VIDEOS". Furthermore, user interface 405 includes a user area 425 that indicates the current user signed into the video application, which in this example is "USER 1", and that also provides a sign-out selection element 430 for the user to sign out of the application. User interface 405 further includes a function title area 435 that indicates a current functional area of the application, which in this non-limiting example is "GOALS" representing a function for interacting with goals. User interface 405 also includes a search area 420 that allows for entering a search within the functional area of the application.

User interface 405 is depicted with a "GOALS" display which includes an available goals area 454 that shows goals that are available to be added to the publishers' goals. It is to be appreciated that the user can specify any suitable number of goals. In this example, available goals area 454 depicts goals "Get Discovered . . . Other" available to be added to goals. In addition, the user can narrow the list of available goals by entering a query in search area 420, results of which would appear in available goals area 454. User interface 405 also includes added to goals area 452 the shows goals that the user has specified. In this example, "USER 1" has selected "Make money from content" and "Make money outside of content as her preferences. User interface 405 includes a scrolling control element 456 for navigating the list of available goals in available goals area 454. It is to be understood that added to goals area 452 can also include a scrolling control element 456 for navigating the list of added goals.

User interface 405 includes a remove goal selection element 457 for moving goals from the list on the left to the list on the right, in this example, moving goals from the added to goals area 452 to the available goals area 454. User interface 405 also includes an add goal selection element 458 for moving goals from the list on the right to the list on the left, in this example, moving goals from the available goals area 454 to the added to goals area 452. For example, "USER 1" can use add goal selection element 458 and remove goal selection element 457 to configure her specified goals for using the content sharing site. The configured goals can be stored by goal query component 210, for example, automatically upon the user navigating away from the "GOALS" display, upon the user selecting a save goals selection element (not depicted), the user performing a specific gesture, or by any other suitable mechanism for storing the configured goals.

Figure 4B:
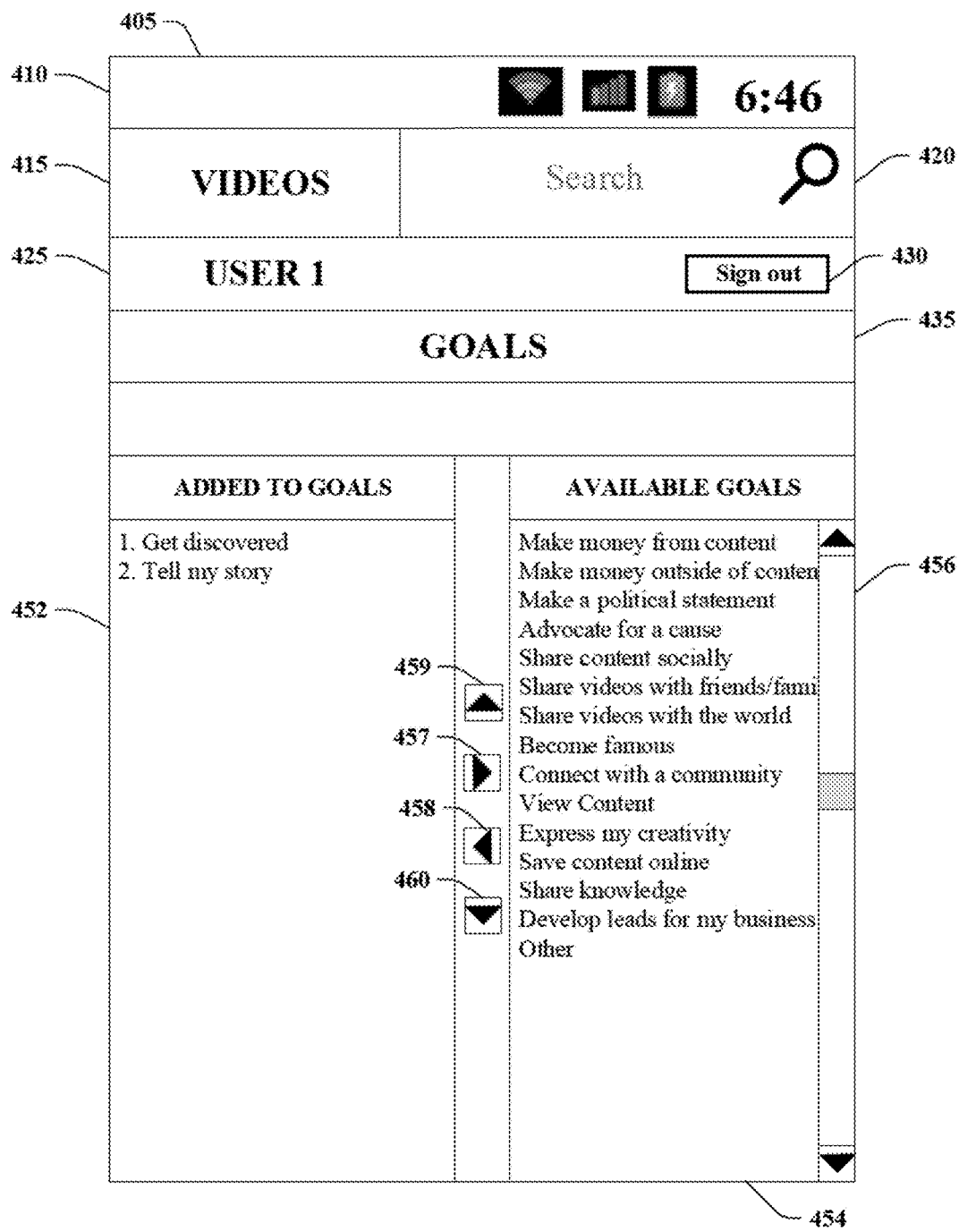
FIG. 4B illustrates a non-limiting example user interface for a publisher to specify and rank their goal(s) in using a content sharing site in accordance with an implementation of this disclosure.

Referring to FIG. 4B, another non-limiting example user interface 405, such as on a client device 150, is illustrated similar to FIG. 4A. However, user interface 405 in FIG. 4B allows for prioritizing goals. For example, if the user has specified more than one goal, she can identify the priority order for the goals. User interface 405 includes a move up selection element 459 for moving a goal up in the list on the left, in this example, moving a goal up in the list of added to goals area 452 thus giving the goal a higher priority. User interface 405 also includes move down selection element 460 for moving a goal down in the list on the left, in this example, moving a goal down in the list of added to goals area 452 thus giving the goal a lower priority. In the depicted example, "USER 1" has selected the goals "Get discovered" and "Tell my story", and further indicated that "Get discovered" has a higher priority than "Tell my story". The configured prioritized goals can be stored by goal query component 210.

It is to be appreciated that FIGS. 4A and 4B are non-limiting examples of user interfaces for querying a publisher for his goal(s) and that any suitable user interface or mechanism can be employed to query a publisher for her goals).

Referring back to FIG. 2, goal based customization component 120 also includes goal learning component 220 that learns attributes associated with publishers that are indicative of specific goals. For example, as publishers specify their goals, goal learning component 220 can employ artificial intelligence algorithms to learn, attributes, such as, demographics, behaviors, content, or any other suitable information associated with the publishers that are indicative of specific goals. For example, a publisher who specifies a goal of trying to "Get discovered" may post content mostly about himself. As such, goal learning component 220 can learn that publishers who post a significant amount of content about themselves are likely to have the goal of "Get discovered". Based upon the learned attributes indicative of particular goals, goal based customization component 120 can infer or suggest goals for a publisher based upon their specific attributes, and can make suggestions without having to explicitly ask the publisher for his goals.

Furthermore, goal query component 210 can periodically, at predefined, user specified, or dynamically determined intervals re-query a user regarding their goals in order to determine changes in goals. Goal learning component 220 can analyze changes in attributes associated with a user who has specified a change in goals to learn attributes that result in a change in goals. Goal query component 210 can employ the learned attributes that result in a change in goals in order to determine when to query a user to specify a change in goals, such as by monitoring changes in the user's attributes indicative of a possible change in goals.

Moreover, goal query component 210 can also employ the re-query of a user regarding their goals in order to introduce new goals. Goal learning component 220 can analyze changes in a user's selection of goals to learn goal descriptions that may provide more clarity regarding goals. For example, goal query component 210 may introduce alternate goals for a pre-existing goal, such as more specific goals. User de-selection of the pre-existing goal in favor of selection of one or more of the alternate goals can indicate to goal learning component 220 that the alternate goals provide a clearer goal description. However, user's not selecting the alternate goals can indicate to goal learning component 220 that the alternate goals do not provide a clearer goal description than the pre-existing goal.

Continuing with reference to FIG. 2, goal based customization component 120 also includes suggestion component 230 that learns suggestions with respect to the content sharing site based upon goals, generates suggestions for publishers based on their goals, monitors success, such as according to a measure of effectiveness, of suggestions for publishers in achieving their goals, and modifies the suggestions based upon their success.

Figure 3:
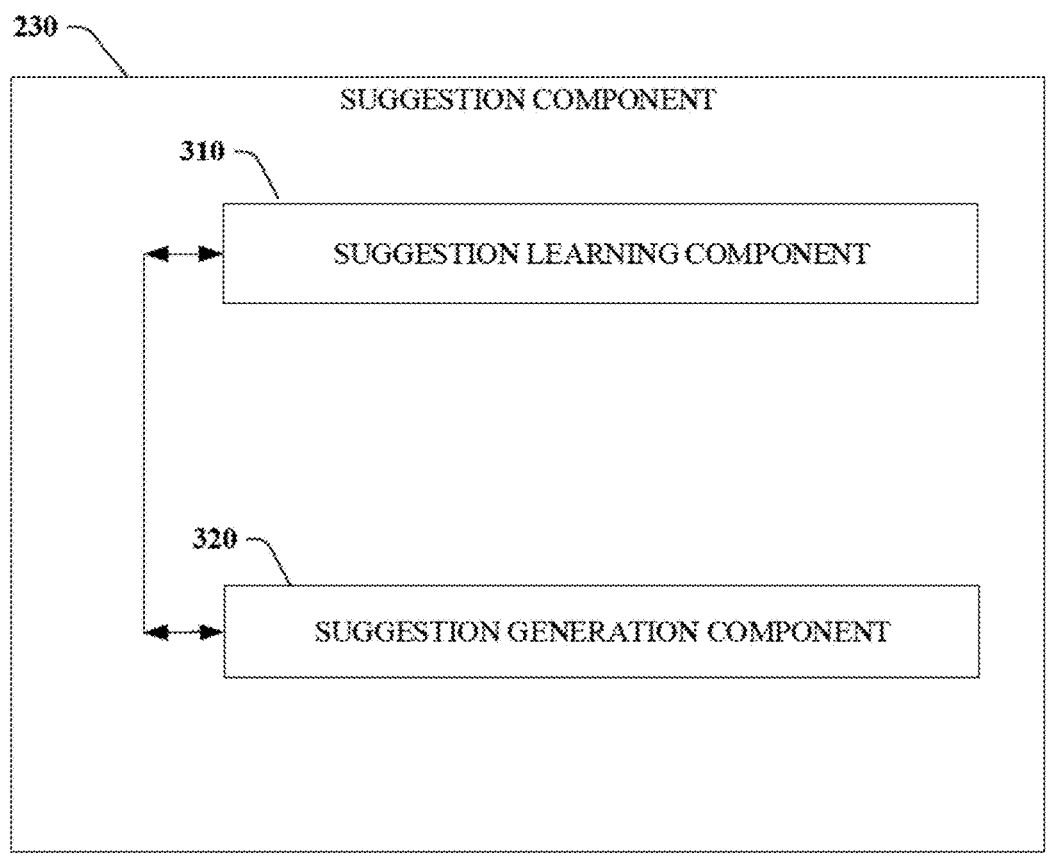
FIG. 3 illustrates a block diagram of an exemplary non-limiting suggestion component that learns suggestions with respect to the content sharing site based upon goals, generates suggestions for publishers based on their goals, monitors success, such as according to a measure of effectiveness, of suggestions for publishers in achieving their goals, and modifies the suggestions based upon their success in accordance with an implementation of this disclosure.

Referring to FIG. 3, suggestion component 230 includes suggestion learning component 310 that monitors (e.g. current or historical data) publishers who have specified their goals or for which goal query component 210 has inferred their goals in order to learn suggestions. Suggestion learning component 310 can employ artificial intelligence algorithms to learn suggestions, such as activities, customizations, features, techniques, or any other suitable information related to a publisher's content, content channel(s), or interaction with the content sharing site that are effective in helping the publisher achieve his goal(s) or that are not effective in helping the publisher achieve his goal(s). In this manner, suggestion learning component 310 can build a mapping between goals and suggestions that are effective in helping the publisher achieve their goal(s) or that are not effective in helping the publisher achieve their goal(s). For example, suggestion learning component 310 can monitor all publishers that have a goal of "Make money from content" to learn suggestions that are effective in helping the publishers achieve her goal of "Make money from content" or that are not effective in helping the publishers achieve her goal of "Make money from content". Effectiveness can be measured by suggestion learning component 310 according to one or more metrics that are associated with each goal.

It is to be appreciated that suggestions can include providing tips on improving content or content channels. For example, tips can be provided on improving text associated with content to make it more attractive to content consumers or easier for content consumers to find the content, such as alternate terms, more descriptive terms, more concise terms, different fonts, different colors, providing alternate languages, adding/removing subtitles, or any other suitable recommendation regarding text. In another example, tips on improving image or video of content can be provided, such as different resolution, different size, different color, sharpening, noise filtering, or any other suitable recommendation regarding image or video of content. In a further example, tips on improving audio of content can be provided, such as different audio quality, alternate languages, noise filtering, sound level, or any other suitable recommendation regarding audio of content. It is to be appreciated that suggestions can relate to any suitable aspect of content, content channels, or communication from a publisher.

Suggestions can also include recommendations on which content should or should not be monetized, what kind of advertising to incorporate with content, recommending tools or feature of the content sharing site, or providing a customized electronic communication (e.g. newsletter, email, text message, mobile notification, or any other suitable electronic communication) based on the goal(s). Further suggestions can include providing a customized dashboard including widgets optimized for a goal. For example, a dashboard that shows a graph of revenue generated can be presented for a goal of "Making money from content", while a graph of number of visitors can be provide for a goal of "Get discovered". Suggestions can also include recommendations on when and when not to upload content based upon effectiveness of time of day, week, month, or year for uploading content to achieve specific goals. Additionally, suggestions can include unlocking features of the content sharing site, providing different levels of support, or providing early access to features of the content sharing site to a publisher based on his goal(s).

Furthermore, suggestions can include providing communications to a publisher in a tone that reflects his goal. For example, a publisher that has a goal of "Make money from content" likely has more technical and business knowledge and can understand communications that involve more technical or business sophistication, while a publisher who has a goal of "Tell my story" may require communications that involve less technical or business sophistication. Suggestions can also include timing of when to switch content from non-monetary to monetary. For example, it may be beneficial for a content to be published in a non-monetary generating mode until it reaches a specific viewership (e.g. allowing it to go viral) before switching to publishing the content in a monetary generating mode. Suggestions can also include ranking comments provided by content consumers for a content or content channel according to a publisher's goal(s). For example, a publisher who has a goal of "Make money outside of content" that published content related to industrial machines he sells may want to have comments by other companies or people at certain companies ranked higher than comments from the general public. In another example, suggestions can include an invitation to an event, such as a conference, web meeting, teleconference, or any other suitable event related to a publisher's goal(s).

It is to be appreciated that suggestions can include any suitable recommendations, tools, features, dashboards, communications, displays, or information to assist a publisher in achieving their goal(s).

Continuing with reference to FIG. 3, suggestion component 230 also includes suggestion generation component 320 that analyzes attributes and goals associated with a publisher in order to provide suggestions to the publisher. For example, if a publisher specifies that her goal is "Share knowledge", suggestion generation component 320 can access suggestions learned for the goal of "Share knowledge" and present one or more of the suggestions to the publisher. It is to be appreciated that suggestion generation component 320 can apply one or more filters, ranking, context of the publisher, attributes of the publisher, type of content, or any other suitable criteria in determining which suggestion(s) to present to the publisher. For example, suggestion generation component 320 can employ the respective measure of effectiveness of the suggestions with respect to the goal in order to rank the goals and provide a predetermined number of top ranked suggestions to the publisher.

In another example, suggestion generation component 320 can employ prioritization that the publisher specified for his goals in order to rank the goals, and rank suggestions associated with a higher priority goal above suggestions associated with a lower priority goal. In a further example, suggestion generation component 320 can determine a context of the publisher, such as a current activity (e.g. uploading content, creating content channel, entering a textual description, sharing content, or any other suitable activity) she is engaged in with the content sharing site in order to select a relevant suggestion associated with her goal(s). In an additional example, suggestion generation component 320 can determine that the publisher is not engaged with the content sharing site and provide a suggestion through a communication mechanism, such as an email newsletter or text messaging, relevant to her goal(s). In another example, suggestion generation component 320 can monitor the success of a publisher in achieving their goal(s) and present suggestions targeting areas where the publisher is not meeting his metrics.

In a further example, suggestion generation component 320 can determine the type of content that the publisher is uploading and present suggestions relevant to the type of content with respect to his goal(s). In an additional example, suggestion generation component 320 can consider attributes of the publisher (e.g. communication preferences, technical knowledge level, business knowledge level, location, language, age, type of device used to access content sharing site, social network, or any other suitable attribute associated with the publisher) in selecting suggestions to present to the publisher to assist in achieving her goals(s). It is to be appreciated that suggestion generation component 320 can employ any suitable criteria for selecting one or more suggestions to present to a publisher with respect to his goal(s).

Continuing with reference to FIG. 3, suggestion learning component 310 can analyze suggestions provide to publisher's by suggestion generation component 320 in order to determine the effectiveness of the suggestions in helping the publisher's achieve her goal(s), such as according to goal specific metrics. Based upon the measure of effectiveness of a suggestion, suggestion learning component 310 eliminate, modify, or maintain the suggestion. For example, if a suggestion is not effective for a goal, suggestion learning component 310 can eliminate the suggestion for the goal. In another example, if a suggestion is not effective for a goal, suggestion learning component 310 can learn a successful modification to the suggestion by monitoring publishers with the goal and modify the suggestion for the goal. In a further example, if a suggestion is effective for a goal, suggestion learning component 310 can maintain the suggestion for the goal. In an additional example, if a suggestion is effective for a goal for only a subset of publisher's with the goal, suggestion learning component 310 can maintain the suggestion for the goal for the subset of publishers, and eliminate or modify the suggestion for other publishers with the goal. Suggestion learning component 310 can also learn attributes of the subset of publisher's that make the suggestion effective for the goal, which can be applied by suggestion generation component 320 in selecting suggestions for presentation.

It is to be appreciated that while components of goal based customization component 120 are depicted as part of content sharing server 110, one or more components of goal based customization component 120 can be part of client device 150. In a non-limiting example, goal query component 210 can be part of client device 150.

Figure 5:
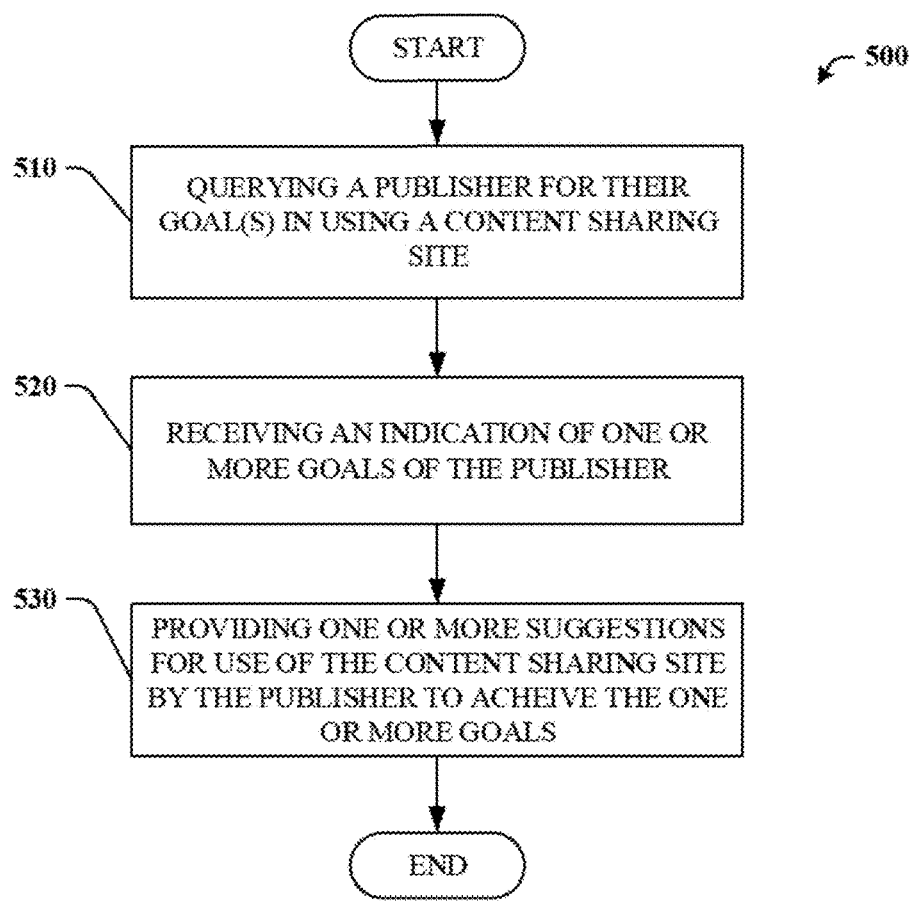
FIG. 5 illustrates an exemplary non-limiting flow diagram for getting explicit specification of a publisher's goal(s) in using a content sharing site and providing customized suggestions for using the content sharing site based upon the specified goal(s) in accordance with an implementation of this disclosure.
Figure 6:
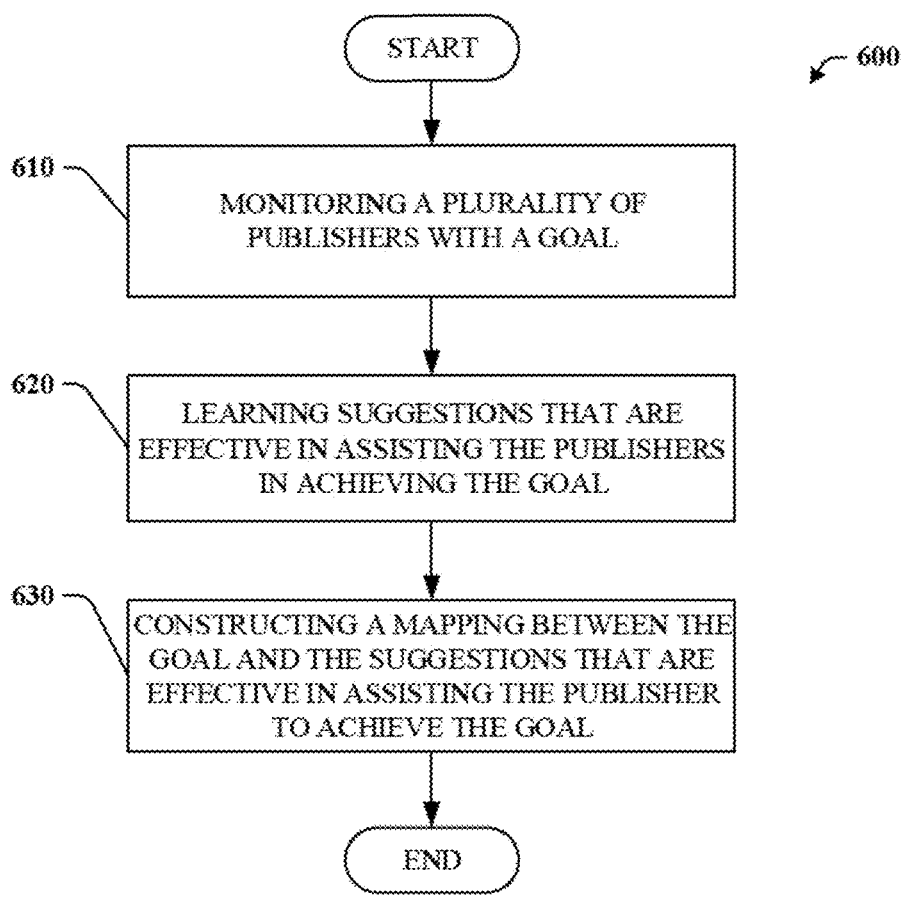
FIG. 6 illustrates an exemplary non-limiting flow diagram for learning suggestions that help publishers achieve a goal in accordance with an implementation of this disclosure.
Figure 7:
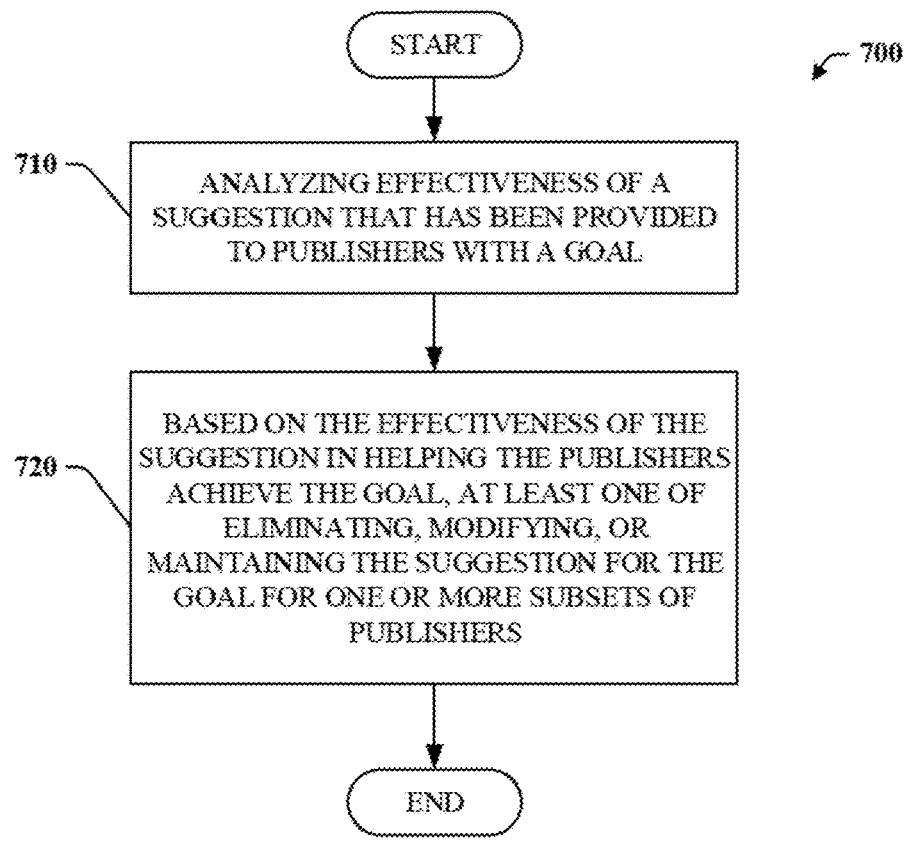
FIG. 7 illustrates an exemplary non-limiting flow diagram for modifying suggestions based on their effectiveness in helping publishers achieve a goal in accordance with an implementation of this disclosure.

FIGS. 5-7 illustrate various methods in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 5 depicts an exemplary method 500 for getting explicit specification of a publisher's goal(s) in using a content sharing site and providing customized suggestions for using the content sharing site based upon the specified goal(s). At reference numeral 510, a publisher is queried regarding his goal(s) for using the content sharing site (e.g., by a goal query component 210, a goal based customization component 120, or content sharing server 110). At reference numeral 520, input is received indicating one or more goals of the publisher (e.g., by a goal query component 210, a goal based customization component 120, or content sharing server 110). At reference numeral 530, providing one or more suggestions for use of the content sharing site by the publisher to achieve the one or more goal(s) (e.g., by a suggestion generation component 320, suggestion learning component 310, suggestion component 230, goal based customization component 120, or content sharing server 110).

FIG. 6 depicts an exemplary method 600 for learning suggestions that help publishers achieve a goal (e.g., by a suggestion learning component 310, suggestion component 230, goal based customization component 120, or content sharing server 110). At reference numeral 610, publishers having a specified goal are monitored. At reference numeral 620, suggestions that are effective in assisting the publishers in achieving the goal are determined or learned. At reference numeral 630, a mapping or association is constructed between the goal and suggestions that are effective in assisting the publishers in achieving the goal.

FIG. 7 depicts an exemplary method 700 for modifying suggestions based on their effectiveness in helping publishers achieve a goal (e.g., by a suggestion learning component 310, suggestion component 230, goal based customization component 120, or content sharing server 110). At reference numeral 710, a suggestion that has been provided to publishers having a specified goal is analyzed for effectiveness in helping the publishers achieve the goal. At reference numeral 720, Based on the effectiveness of the suggestion in helping the publishers achieve the goal, the suggestion is at least one of eliminated, modified, or maintained for the goal for one or more subsets of publishers.

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 8:
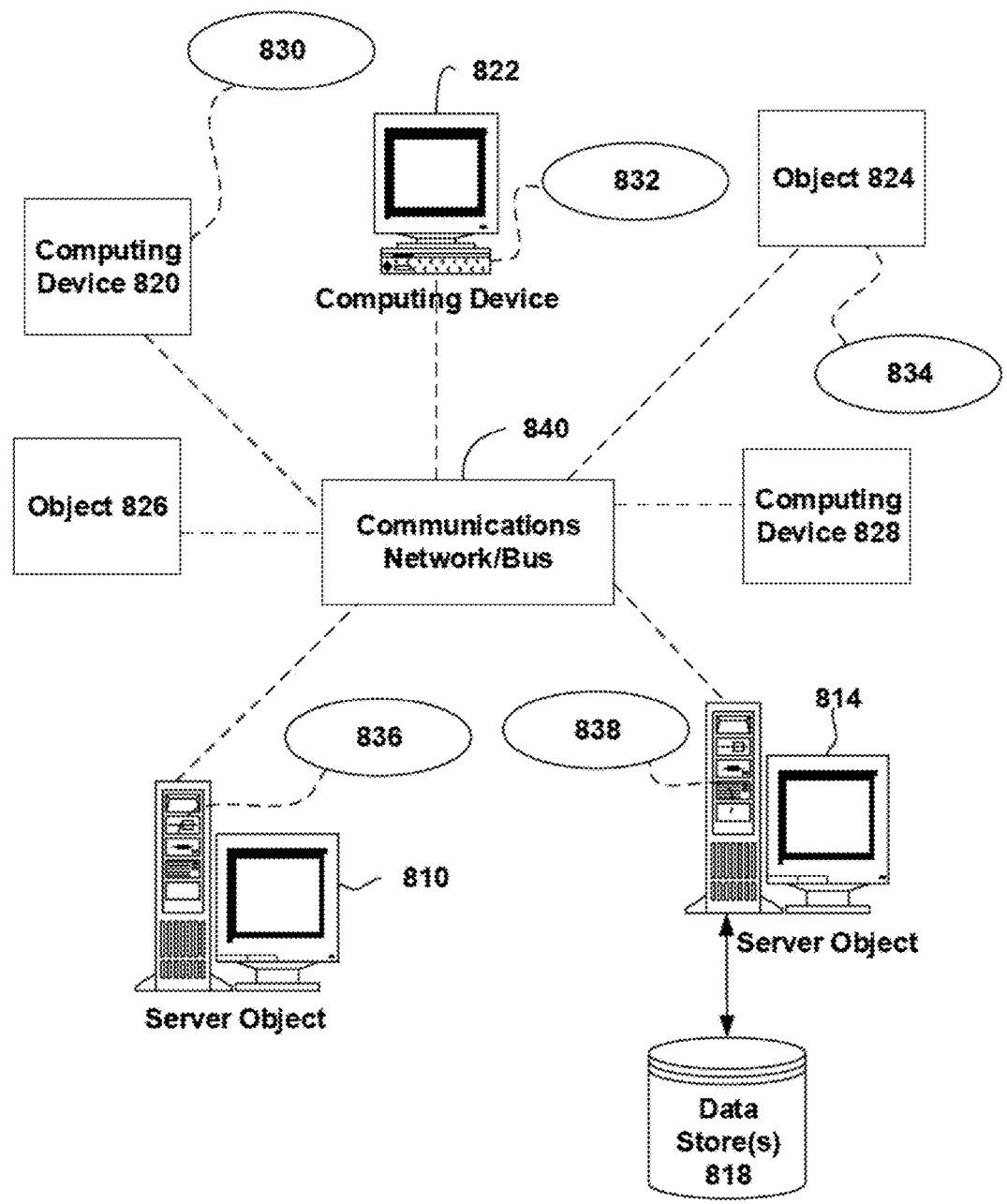
FIG. 8 illustrates a block diagram of an exemplary non-limiting networked environment in which various embodiments can be implemented.

FIG. 8 provides a schematic diagram of an exemplary networked or distributed computing environment. The distributed computing environment comprises computing objects 810, 812, etc. and computing objects or devices 818, 820, 822, 824, 826, 828, etc., which may include programs, methods, data stores, programmable logic, etc., as represented by applications 830, 832, 834, 836, 838. It can be appreciated that computing objects 810, 812, etc. and computing objects or devices 818, 820, 822, 824, 826, 828, etc. may comprise different devices, such as personal digital assistants (PDAs), audio/video devices, mobile phones, MP3 players, personal computers, laptops, tablets, etc.

Each computing object 810, 812, etc. and computing objects or devices 818, 820, 822, 824, 826, 828, etc. can communicate with one or more other computing objects 810, 812, etc. and computing objects or devices 818, 820, 822, 824, 826, 828, etc. by way of the communications network 840, either directly or indirectly. Even though illustrated as a single element in FIG. 8, network 840 may comprise other computing objects and computing devices that provide services to the system of FIG. 8, and/or may represent multiple interconnected networks, which are not shown. Each computing object 810, 812, etc. or computing objects or devices 818, 820, 822, 824, 826, 828, etc. can also contain an application, such as applications 830, 832, 834, 836, 838, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 8, as a non-limiting example, computing objects or devices 818, 820, 822, 824, 826, 828, etc. can be thought of as clients and computing objects 810, 812, etc. can be thought of as servers where computing objects 810, 812, etc. provide data services, such as receiving data from client computing objects or devices 818, 820, 822, 824, 826, 828, etc., storing of data, processing of data, transmitting data to client computing objects or devices 818, 820, 822, 824, 826, 828, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 840 is the Internet, for example, the computing objects 810, 812, etc. can be Web servers, file servers, media servers, etc. with which the client computing objects or devices 818, 820, 822, 824, 826, 828, etc. communicate via any of a number of known protocols, such as the hypertext transfer protocol (HTTP). Objects 810, 812, etc. may also serve as client computing objects or devices 818, 820, 822, 824, 826, 828, etc., as may be characteristic of a distributed computing environment.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the computer described below in FIG. 9 is but one example of a computing device that can be employed with implementing one or more of the systems or methods shown and described in connection with FIGS. 1-7. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 9 thus illustrates an example of a suitable computing system environment 900 in which one or aspects of the embodiments described herein can be implemented, although as made clear above, the computing system environment 900 is only one example of a suitable computing environment and is not intended to suggest any limitation as to scope of use or functionality. Neither is the computing environment 900 be interpreted as having any dependency or requirement relating to any one or combination of components illustrated in the exemplary operating environment 900.

With reference to FIG. 9, an exemplary computing device for implementing one or more embodiments in the form of a computer 910 is depicted. Components of computer 910 may include, but are not limited to, a processing unit 920, a system memory 930, and a system bus 922 that couples various system components including the system memory to the processing unit 920.

Computer 910 typically includes a variety of computer readable media and can be any available media that can be accessed by computer 910. The system memory 930 may include computer storage media in the form of volatile and/or nonvolatile memory such as read only memory (ROM) and/or random access memory (RAM). By way of example, and not limitation, system memory 930 may also include an operating system, application programs, other program modules, and program data.

A user can enter commands and information into the computer 910 through input devices 940, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 910. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970 via network interface 960. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring relationships between metadata or inferring topics of interest to users), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A method, comprising:

presenting, by a system including a processor, on a video content sharing site in association with a user profile associated with a user who has published video content on the video content sharing site, a selection element comprising a plurality of options indicative of respective goals for employing the user profile with the video content sharing site;

receiving, by the system, input associated with the selection element indicating selection of one or more options of the plurality of options;

providing, by the system, a suggestion interface that includes one or more suggestions for improvement of at least one video content item published by the user associated with the user profile on the video content sharing site based upon the selected one or more options;

determining, by the system, whether the one or more suggestions in the suggestion interface are effective in achieving the respective goals based on information associated with a plurality of user profiles having specified goals;

in response to detecting changes to selections of one or more of the plurality of options, determining, by the system, whether one or more additional options further assist the user profile in achieving the respective goals based on the information associated with the plurality of user profiles having specified goals; and changing, by the system, the plurality of options based upon the determination of whether the one or more suggestions are effective in achieving the respective goals and based upon the determination of whether the one or more additional options further assist the user profile in achieving the respective goals.

2. The method of claim 1, wherein the suggestion interface comprises widgets that have been incorporated into a video content management dashboard to achieve the respective goals associated with the selected options.

3. The method of claim 1, wherein the suggestion interface comprises an invitation to a user associated with the user profile to an event to achieve the respective goals associated with the selected options.

4. The method of claim 1, wherein the input further comprises a ranking of the selected options.

5. The method of claim 1, further comprising:

introducing, by the system, the one or more additional options to the plurality of options, wherein the respective additional options are determined to provide more accurate goal descriptions based upon at least one of selection or de-selection of respective options of the plurality of options associated with a plurality of user profiles and wherein the plurality of options are changed based upon the identification of whether the respective additional options provide more accurate goal descriptions.

6. The method of claim 1, further comprising:

analyzing, by the system, the information associated with a plurality of user profiles having specified goals;

learning, by the system, a plurality of suggestions that are effective in achieving the specified goals based on the analysis; and constructing, by the system, a mapping between each of the respective goals and each of the plurality of suggestions that are effective in achieving the respective goals based on the learning.

7. The method of claim 1, further comprising:
determining, by the system, effectiveness of a suggestion provided to a plurality of user profiles to help achieve a goal; and
based upon the determined effectiveness of the suggestion to help the user profiles achieve the goal, modifying, by the system, the suggestion for the goal for one or more subsets of the user profiles.

8. A system, comprising:
at least one processor that, when executing computer executable instructions stored in memory, is configured to:
present on a video content sharing site in association with a user profile associated with a user who has published video content on the video content sharing site, a selection element comprising a plurality of options indicative of respective goals for employing the user profile with the video content sharing site;
receive input associated with the selection element indicating selection of one or more options of the plurality of options;
provide a suggestion interface that includes one or more suggestions for improvement of at least one video content item published by the user associated with the user profile on the video content sharing site based upon the selected one or more options;
determine whether the one or more suggestions in the suggestion interface are effective in achieving the respective goals based on information associated with a plurality of user profiles having specified goals;
in response to detecting changes to selections of one or more of the plurality of options, determine whether one or more additional options further assist the user profile in achieving the respective goals based on the information associated with the plurality of user profiles having specified goals; and
change the plurality of options based upon the determination of whether the one or more suggestions are effective in achieving the respective goals and based upon the determination of whether the one or more additional options further assist the user profile in achieving the respective goals.

9. The system of claim 8, wherein the suggestion interface comprises widgets that have been incorporated into a video content management dashboard to achieve the respective goals associated with the selected options.

10. The system of claim 8, wherein the suggestion interface comprises an invitation to a user associated with the user profile to an event to achieve the respective goals associated with the selected options.

11. The system of claim 8, wherein the input further comprises a ranking of the selected options.

12. The system of claim 8, wherein the at least one processor is further configured to:
introduce the one or more additional options to the plurality of options, wherein the respective additional options are determined to provide more accurate goal descriptions based upon at least one of selection or de-selection of respective options of the plurality of options associated with a plurality of user profiles and wherein the plurality of options are changed based upon the identification of whether the respective additional options provide more accurate goal descriptions.

13. The system of claim 8, wherein the at least one processor is further configured to:

analyze the information associated with a plurality of user profiles having specified goals;
learn a plurality of suggestions that are effective in achieving the specified goals based on the analysis; and
construct a mapping between each of the respective goals and each of the plurality of suggestions that are effective in achieving the respective goals based on the learning.

14. The system of claim 8, wherein the at least one processor is further configured to:
determine effectiveness of a suggestion provided to a plurality of user profiles to help achieve a goal; and
based upon the determined effectiveness of the suggestion to help the user profiles achieve the goal, modify the suggestion for the goal for one or more subsets of the user profiles.

15. A non-transitory computer-readable medium containing computer-executable instructions that, when executed by a processor, cause the processor to perform a method, the method comprising:
presenting on a video content sharing site in association with a user profile associated with a user who has published video content on the video content sharing site, a selection element comprising a plurality of options indicative of respective goals for employing the user profile with the video content sharing site;
receiving input associated with the selection element indicating selection of one or more options of the plurality of options;
providing a suggestion interface that includes one or more suggestions for improvement of at least one video content item published by the user associated with the user profile on the video content sharing site based upon the selected one or more options;
determining whether the one or more suggestions in the suggestion interface are effective in achieving the respective goals based on information associated with a plurality of user profiles having specified goals;
in response to detecting changes to selections of one or more of the plurality of options, determining whether one or more additional options further assist the user profile in achieving the respective goals based on the information associated with the plurality of user profiles having specified goals; and
changing the plurality of options based upon the determination of whether the one or more suggestions are effective in achieving the respective goals and based upon the determination of whether the one or more additional options further assist the user profile in achieving the respective goals.

16. The non-transitory computer-readable medium of claim 15, wherein the suggestion interface comprises widgets that have been incorporated into a video content management dashboard to achieve the respective goals associated with the selected options.

17. The non-transitory computer-readable medium of claim 15, wherein the suggestion interface comprises an invitation to a user associated with the user profile to an event to achieve the respective goals associated with the selected options.

18. The non-transitory computer-readable medium of claim 15, wherein the input further comprises a ranking of the selected options.

19. The non-transitory computer-readable medium of claim 15, wherein the method further comprises:
introducing the one or more additional options to the plurality of options, wherein the respective additional options are determined to provide more accurate goal descriptions based upon at least one of selection or de-selection of respective options of the plurality of options associated with a plurality of user profiles and wherein the plurality of options are changed based upon the identification of whether the respective additional options provide more accurate goal descriptions.

20. The non-transitory computer-readable medium of claim 15, further comprising:
analyzing the information associated with a plurality of user profiles having specified goals;
learning a plurality of suggestions that are effective in achieving the specified goals based on the analysis; and
constructing a mapping between each of the respective goals and each of the plurality of suggestions that are effective in achieving the respective goals based on the learning.

21. The non-transitory computer-readable medium of claim 15, further comprising:
determining effectiveness of a suggestion provided to a plurality of user profiles to help achieve a goal; and
based upon the determined effectiveness of the suggestion to help the user profiles achieve the goal, modifying the suggestion for the goal for one or more subsets of the user profiles.

* * * * *